Sept. 6, 1966 M. I. HENDERSON 3,271,672
PARTICLE STUDYING DEVICE CONTROL CIRCUIT
Original Filed Sept. 20, 1961

Inventor
Michael Ian Henderson
BY
Silverman & Cass
Attys.

United States Patent Office 3,271,672
Patented Sept. 6, 1966

3,271,672
PARTICLE STUDYING DEVICE CONTROL
CIRCUIT
Michael I. Henderson, London, England, assignor to
Coulter Electronics, Inc., Chicago, Ill.
Continuation of application Ser. No. 139,516, Sept. 20,
1961. This application Oct. 4, 1965, Ser. No. 492,732
21 Claims. (Cl. 324—71)

This application is a continuation of application Serial No. 139,516, filed September 20, 1961, now abandoned.

This invention relates generally to a particle analyzing device used in studying the physical properties of particles suspended in a fluid, and more particularly is concerned with an improvement in the analyzing device control circuit disclosed and claimed by Wallace H. Coulter in U.S. Patent application, Serial No. 101,289 filed April 6, 1961, now abandoned.

Reference may be had to the Coulter patent application for the details of the structure upon which this invention comprises an improvement.

Reference may also be had to U.S. Patent No. 2,656,-508 to Wallace H. Coulter and U.S. Patent No. 2,869,078 to Wallace H. Coulter and Joseph R. Coulter, Jr., which describe the basic principles and structures used in scanning particles suspended in a fluid, by one of the Coulter methods.

Small particles, such as blood cells, food and fat particles, fibres, plastics, dusts, catalysts, metals and the like are counted and sized in many modern laboratories, factories and institutions throughout the world by means of the apparatus of the patents referred to hereinabove. According to one of the Coulter methods a suspension is prepared of the particles to be studied in a fluid such as a liquid electrolyte whose resistivity is different than that of the particle. The suspension is drawn through a scanning aperture immersed in the suspension, and each time a suspended particle passes through the aperture, the resistivity of the liquid path within the aperture changes detectably by an amount which is a direct function of the volume of liquid displaced by the particle in the aperture. A direct current is caused to flow through the liquid path in the scanning aperture, and the momentary change in resistivity is manifested in a signal pulse which appears across a pair of scanning electrodes, respectively located on opposite sides of the aperture in the liquid. In the preferred embodiment, the aperture is located in the side wall of a glass tube which is immersed in the liquod suspension contained in a glass beaker. The interior of the tube is hydraulically connected to a closed fluid system which may comprise a mercury manometer. The functions of the mercury manometer are to cause the liquid to be drawn through the scanning aperture and to generate signals indicating the beginning and the end of an analytic run, in the period during which an accurately metered volume of liquid is scanned.

The signal pulses which appear across the two scanner electrodes are amplified and analyzed in a multi-stage electronic circuit in order to count the number of particles having a desired characteristic, to separate signals representing particles of different sizes, and to perform other types of analyses.

Users of structures embodying the principles of the prior art recognized that several problems existed with respect to continuous electric current flow in the scanning aperture and switching transients which caused erroneous results. Because the dimensions of the aperture are on the order of several to 100 microns in size, a small current flowing in the scanning electrode circuit causes a high current density in the aperture which in turn causes the boiling of the liquid in the aperture when the fluid flow ceases at the end of an analytic run. Biological particles, such as blood cells, food particles and bacteria, which come to rest within the aperture under static conditions, that is when the fluid suspension is not flowing, will expand or burst due to the boiling of the liquid within the aperture and become debris. It has been realized, therefore, that means must be utilized to de-energize the scanning electrode circuit when the fluid flow through the aperture ceases.

It also has been realized that the deleterious effects of spurious input signals must be prevented by incorporating means for activating the analyzer circuit of the particle studying device only during the period of an analytic run.

In the above referred to Coulter application, these programming functions were regulated by a complex control circuit comprising a flip-flop circuit having two tubes and other associated components. The flip-flop circuit had two states and its was necessary to provide connections so that the flip-flop could be switched from one state to the other in order to accomplish the desired results.

The primary object of the invention herein is to provide a highly simplified structure which automatically controls the energization of the scanning electrode circuit and the operation of the electronic circuits which analyze the signals generated by the scanning electrode circuit.

Other objects of the invention will appear from the following description of a preferred embodiment of the invention.

Basically the novel structure of the invention comprises an additional stop electrode in the metering section of the manometer and associated novel circuitry for programming the operation of the scanner electrode, and analyzer circuits before, during and after the period of an analytric run.

Figure 1:
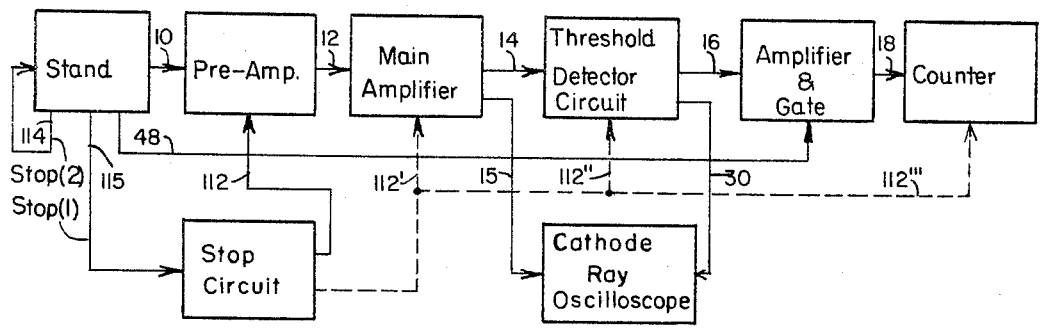
FIG. 1 is a simplified block diagram of a preferred embodiment of a particle studying device with which the invention herein is associated.

In FIG. 1 the block which is marked "Stand" comprises both the signal generating scanning elements and the metering device of the basic apparatus. The commercial version of the apparatus has all of the structure mounted on a single standard; hence, this has come to be known in the art as the "stand."

In the preferred embodiment to be described, the program sequences are synchronized to the beginning and the end of the period of an analytic run by signals which are generated by the movement of the tail of a mercury column in a manometer, past sensing points located on a metering section of the manometer tube.

The scanning signals, generated by the scanning element of the stand in the manner described in the patents, are transmitted to a preamplifier by channel 10. The preamplifier transmits the amplified scanning signals to a main amplifier by way of channel 12. The main amplifier further increases the level of the scanning signals and transmits these signals to the input of a threshold detector circuit via channel 14 and to the vertical deflection amplifier input of a cathode ray oscilloscope via channel 15.

Basically, the threshold detector circuit discriminates between signals whose amplitudes exceed a threshold level and signals whose amplitudes do not exceed that threshold level. In this embodiment, only those portions of the signal pulses having heights in excess of the threshold level will appear at the output on channels 16 and 30. Since the amplitudes of the pulses which occur as the result of the scanning of particles through the aperture are generally directly porportional to the volume of their respective particles, the particles may be sized by varying the threshold level and recording the number of pulses appearang at the threshold detector circuit output.

The functions of the oscilloscope are to display visually the pulses which are amplified by the preamplifier and the main amplifier upon the face of the cathode ray tube and to identify the portions of the pulse envelopes having heights in excess of the threshold level.

The beam intensity circuit of the cathode ray oscilloscope is connected to an output of the threshold detector circuit by channel 30 in order to accomplish the second function.

Channel 16 is connected to the input of an implifier and gate circuit. This circuit performs the dual functions of acting as a signal gate in response to a program signal received from start channel 48 and of generating a count pulse in response to a signal pulse received from channel 16 when gated open in response to a program signal. In this embodiment, the start channel 48 is connected between a manometer start electrode and the amplifier and gate so that when the start electrode is not grounded by the mercury manometer column, the amplifier and gate is closed. When the electrode is grounded, as when the mercury of the manometer engages the electrode, the amplifier and gate will commence to transmit signals via channel 18 to a counter.

The stop circuit is activated or caused to become operative through the engagement of the tail of the mercury column of the manometer with a pair of stop electrodes provided at the downstream end of the metering section. The grounding of the first electrode, STOP (1), by the grounded mercury column serves to bias off, de-activate or otherwise disable one or more of the stages of the analyzing circuit; thereby preventing spurious signals from being transmitted through the circuits. In the particular apparatus shown, a channel 112 for transmitting a disabling signal extends to the preamplifier, but as shown by the broken line connections 112′, 112″ and 112‴, the stop circuit may instead or in addition be connected to the main amplifier or any other convenient following stage.

Figure 2:
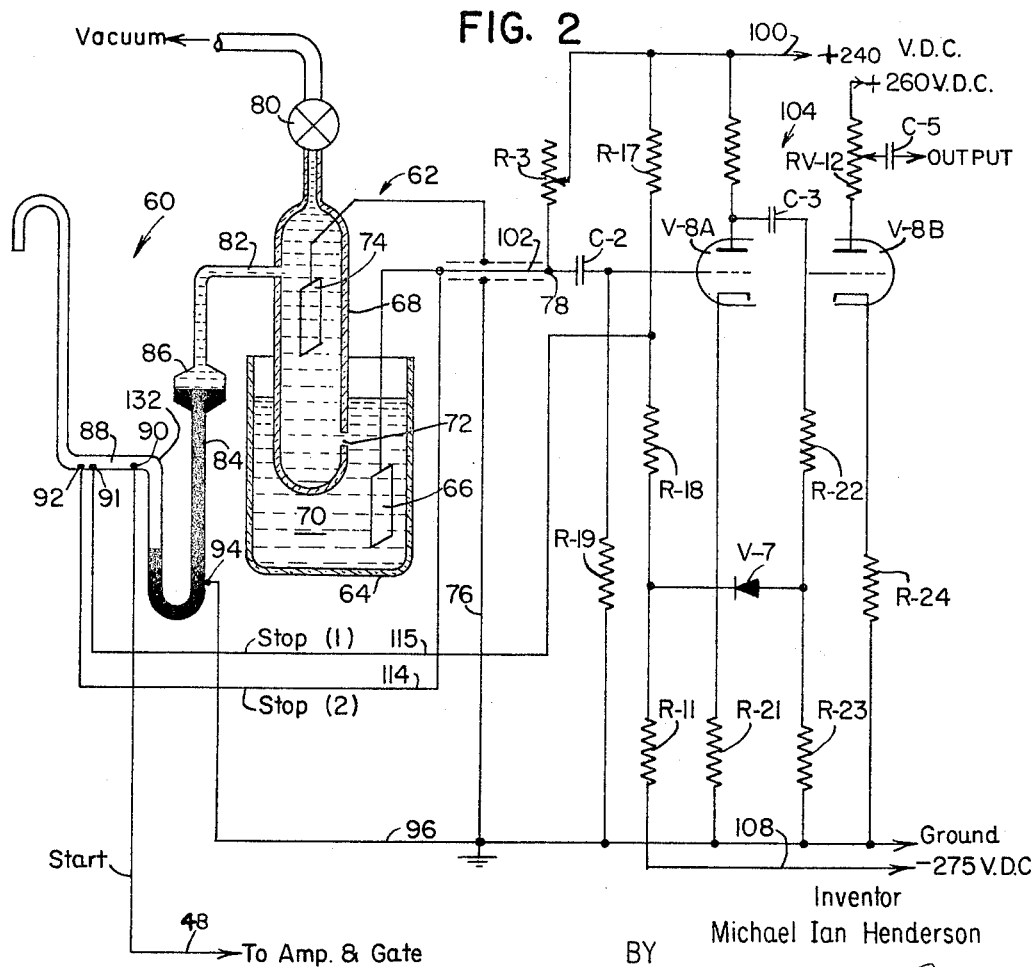
FIG. 2 is a circuit diagram of the invention as incorporated in a Coulter-type particle studying device.

In FIG. 2, there is illustrated a circuit diagram of the stand, preamplifier and stop circuit portions of the particle studying device illustrated in block diagram form in FIG. 1.

The reference character 60 is used generally to designate the manometer or program signal source while the reference character 62 is used generally to designate the scanning signal source. The scanning signal source 62 is formed of a first vessel 64 of insulating material which has a scanning electrode 66 immersed in a suspension 70 which is to be tested. A second insulated vessel 68 in the form of a small diameter tube, having an electrode 74 in its interior, is immersed in the suspension 70 so that a microscopic aperture 72 provided in the side wall of the tube 68 is below the surface of the suspension.

This aperture and the circuit containing electrodes 66 and 74 comprise the scanning means. Each time a particle passes through the aperture there will be a change in the resistance of the electric current path comprising the volume of suspension included within the aperture, which is detectable by the analyzing circuit. The second electrode 74, mounted on the interior of the tube 68, is connected to ground 96 by way of lead 76. The electrode 66 is connected to terminal 78 which is the input terminal of the preamplifier circuit.

It will be noted that the tube 68 is in a closed fluid system, the upper end of which is provided with a valve 80 that leads to a source of vacuum and an upper branch 82 which leads to the manometer 60. The manometer 60 has a column of mercury 84 which is shown in the drawing in an unbalanced condition. The tubing of the manometer is of capillary dimension although shown exaggerated in size for clarity. A mercury reservoir is shown at 86 and there is a relatively horizontal metering section at 88 within which a start electrode 90 and stop electrodes 91 and 92 are located. An electrode 94, for applying to the mercury column a reference potential which is common to the circuits controlled by the electrodes 90, 91 and 92, is connected to reference ground 96 by way of a suitable conductor.

There is a direct electric current which is normally flowing through the aperture 72 at the same time that the fluid suspension 70 is passing through the aperture. This current follows the path which extends from the +240 volt D.C. source which is connected to a bus 100, by way of rheostat R-3 to the terminal 78. From the terminal 78 the current flows by way of connection 102 through the suspension 70 to ground by way of the electrodes 66 and 74 and the connection 76. When a particle passes through the aperture 72, there will be a signal in the form of a voltage pulse appearing at the terminal 78 and this will be applied through coupling condenser C-2 to the grid of triode V-8A of the preamplifier.

The preamplifier is designated generally 104 and as will be seen, it comprises triodes V-8A and V-8B which are connected to amplify the scanning signal. The scanning signal which is applied to the grid of the triode V-8A is amplified in that triode and applied by way of a conventional coupling network through condenser C3 which is connected between the plate of triode V-8A and the grid of the triode V-8B.

The triode V-8A is biased in a conventional manner through the use of a grid leak resistor R-19 and a cathode resistor R-21. The triode V-8B has, in addition to a grid leak resistor R-22 and a cathode resistor R-24, a second grid resistor R-23 to control the bias of the grid in a manner to enable the triode V-8B to be readily biased off, as will be explained.

Signals which are generated by the scanning signal source 62 will appear across the plate load of the triode V-8B comprising gain control potentiometer RV-12, capacitor C-5 and the output circuit, only if both of the triodes V-8A and V-8B are conducting. It will be noted that there is a voltage divider which comprises resistors R-17, R-18 and R-11 connected in series from the +240 volt D.C. bus 100 to the −275 volt D.C. bus 108. There is a diode V-7 which is connected between the junction of resistors R-22 and R-23 and the junction of resistors R-18 and R-11. When the stop electrode 91 is not grounded by the mercury column, the junction of resistors R-17 and R-18 and lead 115, and the junction of resistor R-18 and diode V-7 are at positive potentials. The diode V-7 is back biased, thereby isolating the voltage divider from the grid bias network of the triode V-8B. The triode V-8B is biased for conduction because of the choice of values for resistors R-22, R-23 and R-24. When the stop electrode 91 is grounded, the potential at the cathode of diode V-7 becomes negative, thereby causing the diode to conduct and the bias voltage on the triode V-8B to drop below the triode's cut-off bias voltage.

To initiate an analytic run, the valve 80 is opened and the mercury in the manometer unbalanced to the condition shown. After resetting the counter, the valve 80 is closed and the mercury from the reservoir 86 will now fall to its equilibrium level thereby creating a pressure differential between the inside and the outside of the aperture tube 68 which causes the fluid 70 to be drawn through the aperture 72.

As the amplifier and gate circuit remain biased off, no signals are transmitted to the counter. After the tail of the mercury column passes up bend 132 and engages the electrode 90, a circuit is completed from ground 96 through the common electrode 94 through the mercury column to the start electrode 90 and by way of start channel 48 to the amplifier and gate to open the gate so that pulses may be transmitted to the counter. As the merury column moves toward equilibrium, the suspension 70 is drawn through the aperture 72. The scanning signals which are generated appear across the electrodes 74 and 66 may pass through the apparatus and may be counted.

The counting continues during the period of the analytic run until the tail of the mercury column traverses the entire metering section 88 and engages the first stop electrode 91. When this occurs, the junction of the resistors R–17 and R–18 is placed at ground potential; thereby causing triode V–8B to be biased to cut-off as described above. No signals will pass through the triode V–8B thereafter. Immediately after this occurs, the tail of the mercury column reaches the second stop electrode 92 and establishes a circuit from the conductor 76 through the ground 96 to the common electrode 94, through the mercury column to the electrode 92, by way of the conductor 114 to the electrode 66, thereby placing a direct short circuit across the electrodes 66 and 74 and preventing any further flow of current through the liquid path in the aperture.

In the patent application which has been referred to above, a start-stop flip-flop circuit was used to perform the function of disabling a stage following the input terminal 78 while also cutting off the flow of current to the aperture. Since the flip-flop is a two-state device, it was necessary to provide a circuit for changing the flip-flop from one state to the other. Such a provision is unnecessary in the circuit of this invention as the structure of the metering section comprising the three electrodes and the grounded mercury column serves as the "memory" for the program circuit.

The heart of the structural novelty lies in the use of the third electrode 92. Unlike the metering apparatus taught in U.S. Patent No. 2,869,078 which contains only one start electrode and one stop electrode, the metering structure of this invention allows the independent programming of scanner electrodes and the analyzer circuits without the need for an external memory or isolation circuit such as a flip-flop. Further the circuit of the invention is fully automatic for as soon as fluid flow is restored in the aperture 72, the pressure differential within the closed fluid system causes the tail of the mercury column to withdraw above the electrode 92, thereby restore the scanning electrode current. No memory or reset switch is necessary; therefore a more reliable circuit having a lower cost is readily achieved.

What it is desired to secure by Letters Patent in the United States is:

1. A particle analyzer, for studying particles suspended in a fluid, comprising:
    (a) fluid suspended particle scanning means, having a pair of scanner electrodes, for generating scanning signals, each signal having a parameter which is a function of a physical property of a respective scanned particle;
    (b) means for analyzing the scanning signals;
    (c) liquid manometer means for metering the volume of fluid scanned, having a metering section;
    (d) means for sensing the passage of the manometer liquid past a first point in the metering section and for generating a first program signal;
    (e) means for sensing the passage of the manometer liquid past a second point in the metering section and for generating a second program signal;
    (f) means for sensing the passage of the manometer liquid past a third point in the metering section and for generating a third program signal;
    (g) means for activating the analyzing means in response to the receipt of the first program signal;
    (h) means for de-activating the analyzing means in response to the receipt of the second program signal; and
    (i) means for de-energizing the scanning means in response to the receipt of the third program signal;

the first point being separated from the other points by a distance which is a function of the volume of fluid scanned during the period of an analytic run, whereby the analyzing means are activated only during the period of an analytic run and the scanning means are de-energized after an analytic run.

2. The combination recited in claim 1 wherein the sensing means generate program signals in response to the passage of the tail of the manometer liquid past their respective points.

3. The combination recited in claim 1 wherein the manometer liquid is electrically conductive and the sensing means comprise electrodes having portions within the interior of the metering section whereby they may contact the manometer liquid.

4. The combination of claim 1 wherein the first sensing means are upstream of the other sensing means.

5. The combination recited in claim 1 wherein the second sensing means are upstream of the third sensing means.

6. The combination recited in claim 3 wherein the means for de-energizing the scanning means incorporate means for short circuiting the pair of scanner electrodes comprising:
    (a) means for maintaining one of the scanner electrodes and the manometer liquid at the same potential; and
    (b) means for maintaining the third sensing electrode and the other scanner electrode at the same potential
whereby passage of the manometer liquid past the third sensing electrode causes both scanner electrodes to be maintained at the same potential.

7. A particle analyzing device, for studying particles suspended in a fluid, comprising:
    (a) fluid suspended particle scanning means, having a pair of scanner electrodes for generating scanning signals, each signal having a parameter which is a function of a physical property of a respective scanned particle;
    (b) means for analyzing the scanning signals;
    (c) liquid mercury manometer means for metering the volume of fluid scanned, having a metering section;
    (d) means for applying a potential to the mercury in the manometer;
    (e) a first electrode located at a first point on the metering section and having a portion of its surface within the interior of the metering section;
    (f) a second electrode located at a second point on the metering section and having a portion of its surface within the interior of the metering section;
    (g) a third electrode located at a third point on the metering section and having a portion of its surface within the interior of the metering section;
    (h) means for activating the analyzing means when a first terminal is constrained to the same potential as that applied to the mercury in the manometer;
    (i) means for de-activating the analyzing means when a second terminal is constrained to the same potential as that applied to the mercury in the manometer;
    (j) means for maintaining one of the scanner electrodes at the same potential as that applied to the mercury in the manometer;
    (k) means for maintaining the third electrode and the other scanner electrode at the same potential;
    (l) a first conductor connecting the first electrode to the first terminal; and
    (m) a second conductor connecting the second electrode to the second terminal.

8. In a particle analyzer for studying particles suspended in a fluid having fluid suspended particles scanning means, incorporating a pair of scanner electrodes, for generating scanning signals, each signal having a parameter which is a function of a physical property of a respective scanned particle; and means for analyzing the scanning signals, a particle analyzer control system comprising:

(a) liquid manometer means for metering the volume of fluid scanned, having a metering section;
(b) means for sensing the passage of the manometer liquid past a first point in the metering section and for generating a first program signal;
(c) means for sensing the passage of the manometer liquid past a second point in the metering section and for generating a second program signal;
(d) means for sensing the passage of the manometer liquid past a third point in the metering section and for generating a third program signal;
(e) means for activating the analyzing means in response to the receipt of the first program signal;
(f) means for de-activating the analyzing means in response to the receipt of the second program signal; and
(g) means for de-energizing the scanning means in response to the receipt of the third program signal, the first point being separated from the other points by a distance which is a function of the volume of fluid scanned during the period of an analytic run, whereby the analyzing means are activated only during the period of an analytic run and the scanning means are de-energized after an analytic run.

9. The combination recited in claim 8 wherein the sensing means generate program signals in response to the passage of the tail of the manometer liquid past their respective points.

10. The combination recited in claim 8 wherein the manometer liquid is electrically conductive and the sensing means comprise electrodes having portions within the interior of the metering section whereby they may contact the manometer liquid.

11. The combination of claim 8 wherein the first sensing means are upstream of the other sensing means.

12. The combination recited in claim 8 wherein the second sensing means are upstream of the third sensing means.

13. The combination recited in claim 10 wherein the means for de-energizing the scanning means incorporate means for short circuiting the pair of scanner electrodes comprising:
(a) means for maintaining one of the scanner electrodes and the manometer liquid at the same potential; and
(b) means for maintaining the third sensing electrode whereby passage of the manometer liquid past the third sensing electrode causes both scanner electrodes to be maintained at the same potential.

14. In a particle analyzer for studying particles suspended in a fluid having fluid suspended particle scanning means, incorporating a pair of scanner electrodes, for generating scanning signals, each signal having a parameter which is a function of a physical property of a respective scanned particle; and means for analyzing the scanning signals, a particle analyzer control system comprising:
(a) liquid mercury manometer means for metering the volume of fluid scanned, having a metering section;
(b) means for applying a potential to the mercury in the manometer;
(c) a first electrode located at a first point on the metering section and having a portion of its surface within the interior of the metering section;
(d) a second electrode located at a second point on the metering section and having a portion of its surface within the interior of the metering section;
(e) a third electrode located at a third point on the metering section and having a portion of its surface within the interior of the metering section;
(f) means for activating the analyzing means when a first terminal is constrained to the same potential as that applied to the mercury in the manometer;
(g) means for de-activating the analyzing means when a second terminal is constrained to the same potential as that applied to the mercury in the manometer;
(h) means for maintaining one of the scanner electrodes at the same potential as that applied to the mercury in the manometer; and
(i) means for maintaining the third electrode and the other scanner electrode at the same potential.

15. A fluid metering device, for metering a volume of fluid suspension containing particles which are scanned during a period of an analytic run by a particle analyzer incorporating means for activating the analyzer upon receipt of a first program signal, means for de-activating the analyzer upon receipt of a second program signal, means for scanning particles having a pair of scanning electrodes and means for de-energizing the scanning electrodes upon receipt of a third program signal, comprising:
(a) means for separating two bodies of fluid suspension having a scanning aperture through which a volume of fluid suspension may pass when a fluid pressure differential exists across the aperture; and
(b) manometer means for causing a pressure differential to exist across the aperture and for metering the volume of fluid passing through the aperture incorporating
(i) a manometer tube having a metering section in fluid connection with the aperture,
(ii) a manometer liquid within the tube,
(iii) means for sensing the movement of the manometer liquid past a first point in the metering section and for generating the first program signal in response to this event,
(iv) means for sensing the movement of the manometer liquid past a second point in the metering section and for generating the second program signal in response to this event, and
(v) means for sensing the movement of the manometer liquid past a third point in the metering section and for generating the third program signal in response to this event;
the first being separated from the other points by a distance which is a function of the volume of the fluid suspension which is scanned during the period of an analytic run.

16. The combination recited in claim 15 wherein the sensing means generate program signals in response to the passage of the tail of the manometer liquid past their respective points.

17. The combination recited in claim 15 wherein the manometer liquid is electrically conductive and the sensing means comprise electrodes having portions within the interior of the metering section whereby they may contact the manometer liquid.

18. The combination of claim 15 wherein the first sensing means are upstream of the other sensing means.

19. The combination recited in claim 15 wherein the second sensing means are upstream of the third sensing means.

20. The combination recited in claim 17 wherein the means for de-energizing the scanning means incorporate means for short circuiting the pair of scanner electrodes comprising:
(a) means for maintaining one of the scanner electrodes and the manometer liquid at the same potential; and
(b) means for maintaining the third sensing electrode and the other scanner electrode at the same potential whereby passage of the manometer liquid past the third sensing electrode causes both scanner electrodes to be maintained at the same potential.

21. A fluid metering device, for metering a volume of fluid suspension containing particles which are scanned during a period of an analytic run by a particle analyzer incorporating means for scanning particles having a pair of scanning electrodes, means for activating the analyzer when a first terminal is constrained to a reference potential and means for de-activating the analyzer when a second terminal is constrained to the reference potential, comprising:
(a) means for separating two bodies of fluid suspension having a scanning aperture through which a volume of fluid suspension may pass;
(b) a manometer tube having a metering section in fluid connection with the aperture;
(c) a liquid mercury column within the manometer tube;
(d) means for applying the reference potential to the mercury column and one of the scanning electrodes;
(e) a first electrode located at a first point on the metering section and having a portion of its surface within the interior of the metering section;
(f) a second electrode located at a second point on the metering section and having a portion of its surface within the interior of the metering section;
(g) a third electrode located at a third point on the metering section and having a portion of its surface within the interior of the metering section;
(h) a conductor connecting the first electrode to the first terminal;
(i) a conductor connecting the second electrode to the second terminal; and
(j) a conductor connecting the third electrode to the other scanning electrode;

the first point being separated from the other points by a distance which is a function of the volume of the fluid suspension which is scanned during the period of an analytic run whereby the analyzer is activated only during the period of an analytic run and the scanning electrodes are de-energized after an analytic run.

No references cited.

WALTER L. CARLSON, *Primary Examiner.*
CHARLES F. ROBERTS, *Assistant Examiner.*